(12) United States Patent
Somarakis et al.

(10) Patent No.: US 12,198,323 B2
(45) Date of Patent: Jan. 14, 2025

(54) IMAGE PROCESSING TECHNIQUES FOR JETTING QUALITY CLASSIFICATION IN ADDITIVE MANUFACTURING

(71) Applicants: Xerox Corporation, Norwalk, CT (US); Palo Alto Research Center Incorporated, Palo Alto, CA (US)

(72) Inventors: Christoforos Somarakis, Gilroy, CA (US); Robert R. Price, Palo Alto, CA (US); Svyatoslav Korneev, San Jose, CA (US); Matt Patterson, Raleigh, NC (US); Adrian Lew, Stanford, CA (US); Brendan Mcnamara, Durham, NC (US); Eli Wilson, Raleigh, NC (US)

(73) Assignee: Xerox Corporation, Norwalk, CT (US)

( * ) Notice: Subject to any disclaimer, the term of this patent is extended or adjusted under 35 U.S.C. 154(b) by 390 days.

(21) Appl. No.: 17/840,886

(22) Filed: Jun. 15, 2022

(65) Prior Publication Data
US 2023/0410277 A1    Dec. 21, 2023

(51) Int. Cl.
| G06T 7/00 | (2017.01) |
| G05B 19/4093 | (2006.01) |
| G06T 7/11 | (2017.01) |
| G06T 7/194 | (2017.01) |
| G06V 10/25 | (2022.01) |
| G06V 10/40 | (2022.01) |

(52) U.S. Cl.
CPC ...... *G06T 7/0004* (2013.01); *G05B 19/40932* (2013.01); *G06T 7/11* (2017.01); *G06T 7/194* (2017.01); *G06V 10/25* (2022.01); *G06V 10/40* (2022.01); *G05B 2219/36175* (2013.01); *G06T 2200/24* (2013.01); *G06T 2207/30144* (2013.01)

(58) Field of Classification Search
CPC .................. B33Y 50/00; B33Y 50/02
See application file for complete search history.

(56) References Cited

U.S. PATENT DOCUMENTS

| 9,114,606 B1 * | 8/2015 | Ready | B41J 2/04561 |
| 2018/0215143 A1 * | 8/2018 | Hoover | B41J 25/001 |
| 2018/0256817 A1 * | 9/2018 | Ohwada | A61M 5/16804 |
| 2019/0001576 A1 * | 1/2019 | Eller | B29C 64/209 |
| 2019/0255779 A1 * | 8/2019 | Blomaard | B29C 64/112 |
| 2020/0282659 A1 * | 9/2020 | Lan | B29C 64/245 |
| 2020/0338831 A1 * | 10/2020 | Watanabe | B22F 10/14 |

(Continued)

OTHER PUBLICATIONS

U.S. Appl. No. 17/356,604, filed Jun. 24, 2021.

*Primary Examiner* — Benjamin O Dulaney
(74) *Attorney, Agent, or Firm* — Womble Bond Dickinson (US) LLP

(57) ABSTRACT

Techniques for determining print quality for a 3D printer are disclosed. An example method includes obtaining an image of a stream of material jetted from a nozzle of the 3D printer, and binarizing the image to distinguish background features from foreground features contained in the image. The method also includes identifying elements of jetted material in the foreground features, and computing statistical data characterizing the identified elements. The method also includes generating a quality score of jetting quality based on the statistical data and controlling the 3D printer based on the quality score. The quality score indicates a degree to which the elements of jetted material form droplets of a same size, shape, alignment, and jetting frequency.

20 Claims, 15 Drawing Sheets

(56) References Cited

U.S. PATENT DOCUMENTS

| | | | |
|---|---|---|---|
| 2021/0379664 A1* | 12/2021 | Gibson | B22F 12/57 |
| 2023/0137929 A1* | 5/2023 | Lee | B29C 64/209 |
| | | | 604/272 |

* cited by examiner

IMAGE PROCESSING TECHNIQUES FOR JETTING QUALITY CLASSIFICATION IN ADDITIVE MANUFACTURING

TECHNICAL FIELD

Implementations of the present disclosure relate to techniques for determining the jetting quality in additive manufacturing and image processing techniques for use in same.

BACKGROUND

Additive manufacturing (often known as 3D printing) enables production of structures that optimize strength to weight ratios. For example, hollow structures that are expensive or difficult to achieve in machining processes (i.e., removal of materials by cutting) may be created layer by layer in additive manufacturing. Many forms of additive manufacturing make use of transforming matter from one state to another, such as from liquid to solid, by chemical reactions or by heat (e.g., melting materials at specific locations and solidifying when cooled).

One particular type of 3D printer is a magnetohydrodynamic (MHD) printer, which is suitable for depositing liquid metal layer upon layer to form a 3D metallic object. In a MHD printer, an electrical current flows through a metal coil, which produces time-varying magnetic fields that induce eddy currents within a reservoir of liquid metal compositions. Coupling between magnetic and electric fields within the liquid metal results in Lorentz forces that cause drops of the liquid metal to be ejected (also referred to as jetted) through a nozzle of the printer. The nozzle may be controlled to select the size and shape of the drops. The build platform can be controlled so that the drops land on the substrate in a controlled manner to build the 3D object.

Depending on the type of 3D printing technology, the quality of the output may be highly dependent on a variety of factors, including the consistency and quality of the jet of droplets being ejected onto the substrate. If the droplet deposition becomes erratic, the 3D printed part may deviate significantly from its intended form.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments. Like numerals indicate like elements

DETAILED DESCRIPTION

Figure 1:
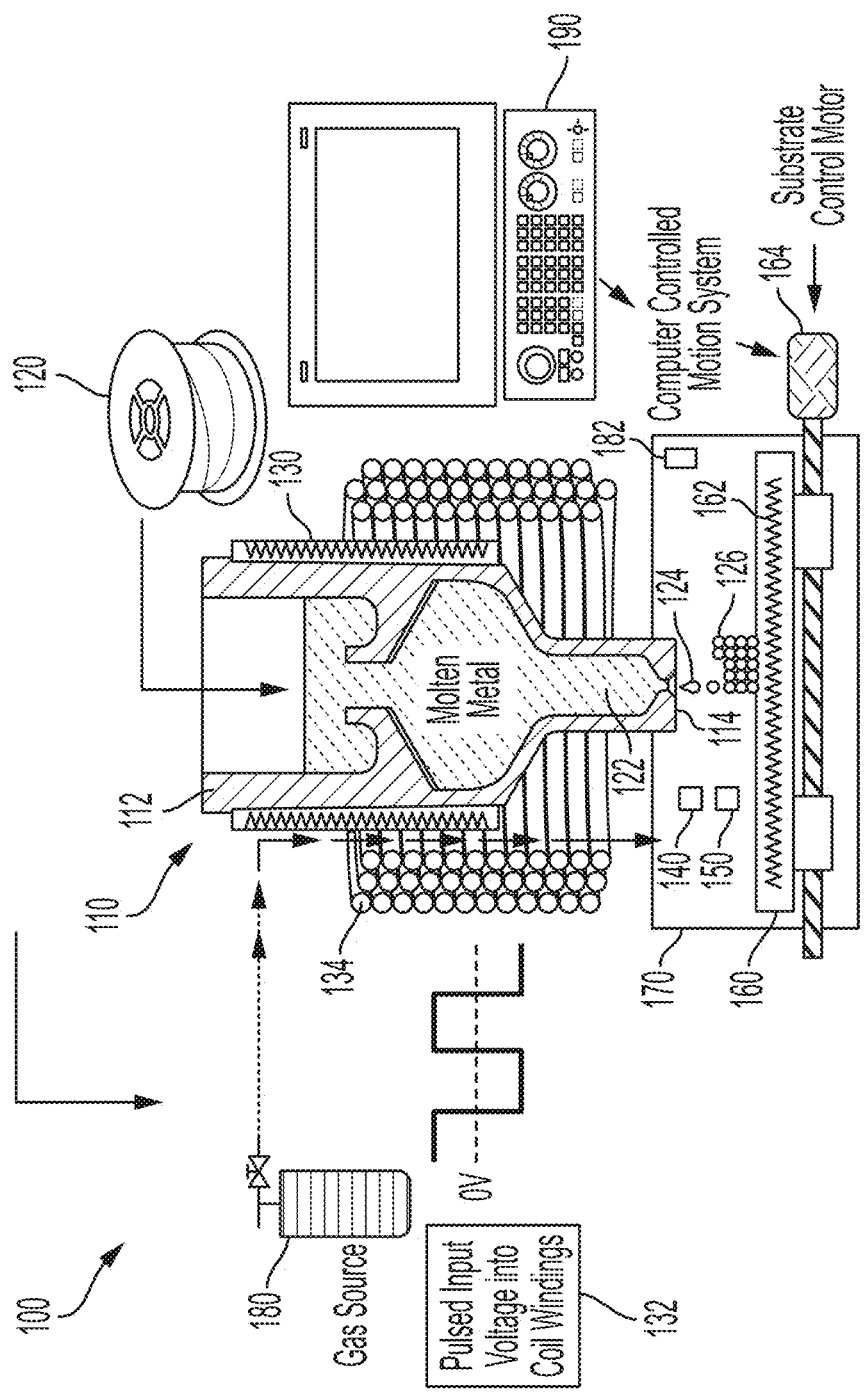
FIG. 1 depicts a schematic cross-sectional view of a 3D printer 100, in accordance with certain aspects of the present disclosure.

Aspects of the present disclosure provides various techniques for determining the printing quality of a 3D printer. The techniques disclosed herein are applicable to 3D printing processes that use liquid metal jetting technology. In liquid metal jetting, a molten metal is ejected from a nozzle and deposited onto a substrate. In such techniques, a single molten droplet deposited on a solid of the same material serves as the basic building block for fabrication by precise, dropwise deposition.

To ensure quality 3D printing, the stream of droplets should be consistent and predictable. The quality of the printing process may be compromised if the stream of droplets becomes irregular, for example, if the drops deviate from a jetting path, break into smaller fragments, have inconsistent shapes, or inconsistent ejection frequency. Various conditions of the 3D printer could cause such inconsistencies, such as fouling of the print nozzle, for example.

The present disclosure describes techniques for assessing the quality of the printing process using automated image capture, processing, and analysis. In accordance with embodiments, images of ejected droplets are captured and provided to a diagnostic software tool that can automatically process the images to determine the quality of the printing process. Captured images of droplets may be processed on the fly in an iterative fashion during droplet ejection, thereby providing the user an automatic real-time diagnosis of 3D print quality. In some embodiments, the diagnostic process described herein may be performed prior to initiation of a print job to ensure that the 3D printer is in a suitable operating condition. In some embodiments, the diagnostic process may be performed iteratively throughout the performance of a print job to ensure continued 3D print quality.

The techniques described herein involve various image processing techniques that make it possible to identify and characterize droplets with a high degree of fidelity. The image capture setup may include a camera and a light source positioned in a manner to illuminate the ejected droplets and capture images of the ejected droplets.

The ejected material is identified by distinguishing the foreground from the background through a process referred to herein an binarization. Binarization refers to the process of dividing the image pixels into two groups and assigning one of two values to all the members of the same group (e.g., ones and zeros). The resulting images may be processed using feature extraction algorithms that identify characteristics of the stream of jetted material, such as the speed, shape, and location of droplets, among others.

Binarization can be a challenging process to perform accurately, especially when the test setup changes due to variations in lighting and the position and orientation of the camera. If the binarization process is inaccurate, then droplet information may be removed from the images or excessive noise may be introduced into the images. The present disclosure describes various thresholding techniques that be can be used to quickly and accurately binarize captured images.

Variations in the test setup may also make it difficult for image processing algorithms to accurately determine the region of interest within the images, i.e., the region that contains jetting. Accordingly, embodiments of the present disclosure also provide techniques for automatically determining the region of interest. The techniques described herein enable a diagnostic software tool to quickly and accurately identify droplet characteristics and determine the quality of the print setup in real-time, for example while a print job is being processed.

FIG. 1 depicts a schematic cross-sectional view of a 3D printer 100, in accordance with certain aspects of the present disclosure. The 3D printer 100 may include an ejector (also referred to as a pump chamber) 110. The ejector 110 may define an inner volume that is configured to receive a printing material 120. The printing material 120 may be or include a metal, a polymer (e.g., a photopolymer), or the like. For example, the printing material 120 may be or include aluminum (e.g., a spool of aluminum wire).

The 3D printer 100 may also include one or more heating elements 130. The heating elements 130 are configured to melt the printing material 120 within the inner volume of the ejector 110, thereby converting the printing material 120 from a solid material to a liquid material (e.g., liquid metal) 122 within the inner volume of the ejector 110.

The 3D printer 100 may also include a power source 132 and one or more metallic coils 134. The metallic coils 134 are wrapped at least partially around the ejector 110 and/or the heating elements 130. The power source 132 may be coupled to the coils 134 and configured to provide power thereto. In one embodiment, the power source 132 may be configured to provide a step function direct current (DC) voltage profile (e.g., voltage pulses) to the coils 134, which may create an increasing magnetic field. The increasing magnetic field may cause an electromotive force within the ejector 110, that in turn causes an induced electrical current in the liquid metal 122. The magnetic field and the induced electrical current in the liquid metal 122 may create a radially inward force on the liquid metal 122, known as a Lorenz force. The Lorenz force creates a pressure at an inlet of a nozzle 114 of the ejector 110. The pressure causes the liquid metal 122 to be jetted through the nozzle 114 in the form of one or more drops 124.

The 3D printer 100 may also include one or more cameras (one is shown: 140) that is/are configured to capture video and/or images of the drops 124. In one embodiment, the video may include signals derived from a sequence of images. In another embodiment, the images may be or include frames of the video. In one particular example, a strobe construction of the jetting may be achieved by capturing a plurality of individual images/frames with different time delays from multiple drop ejections. The camera 140 may be or include a high-speed camera that is configured to capture the images and/or video at a rate of from about 2,000 frames per second to about 50,000 frames per second or about 10,000 frames per second to about 30,000 frames per second (e.g., 19,000 frames per second). In one example, the jetting may occur at a frequency from about 100 Hz to about 1000 Hz, and the camera 140 may operate at a frequency from about 10,000 frames per second to about 50,000 frames per second. In one embodiment, front face monitoring during the jetting of the drops may be triggered by the 3D printer 100 as a normal checkup, operator intervention, detection of irregular jetting, and/or by detection of greater than usual deviations of the 3D printer 100.

The 3D printer 100 may also include one or more light sources (one is shown: 150) that is/are configured to shine light on the nozzle 114, the drops 124, or both. The light source 150 may be or include a fiber optic light source, an LED light source, and others. The light source 150 may be or include a collimated light source. The light source 150 may be or include a white light source.

The 3D printer 100 may also include a substrate (also referred to as a build plate or build platform) 160 that is positioned below the nozzle 114. The drops 124 that are jetted through the nozzle 114 may land on the substrate 160 and cool and solidify to produce a 3D object 126. The substrate 160 may include a heater 162 therein that is configured to increase the temperate of the substrate 160. The 3D printer 100 may also include a substrate control motor 164 that is configured to move the substrate 160 as the drops 124 are being jetted (i.e., during the printing process) to cause the 3D object 126 to have the desired shape and size. The substrate control motor 164 may be configured to move the substrate 160 in one dimension (e.g., along an X axis), in two dimensions (e.g., along the X axis and a Y axis), or in three dimensions (e.g., along the X axis, the Y axis, and a Z axis). In another embodiment, the ejector 110 and/or the nozzle 114 may be also or instead be configured to move in one, two, or three dimensions.

In one embodiment, the 3D printer 100 may also include an enclosure 170. The enclosure 170 may be positioned at least partially around the ejector 110, the nozzle 114, the drops 124, the 3D object 126, the heating elements 130, the coils 134, the camera 140, the light source 150, the substrate 160, or a combination thereof. In one embodiment, the enclosure 170 may be hermetically sealed. In another embodiment, the enclosure 170 may not be hermetically sealed. In other words, the enclosure 170 may have one or more openings that may allow gas to flow therethrough. For example, the gas may flow out of the enclosure 170 through the openings.

In one embodiment, the 3D printer 100 may also include one or more gas sources (one is shown: 180). The gas source 180 may be positioned outside of the enclosure 170 and configured to introduce gas into the enclosure 170. The gas source 180 may be configured to introduce a gas that flows (e.g., downward) around the ejector 110, the nozzle 114, the heating elements 130, or a combination thereof. The gas may flow around and/or within the coils 134. The gas may flow into the enclosure 170 and/or proximate to (e.g., around) the drops 124, the 3D object 126, and/or the substrate 160.

The 3D printer 100 may also include a gas sensor 182. The gas sensor 182 may be positioned within the enclosure 170. The gas sensor 182 may also or instead be positioned proximate to the drops 124, the 3D object 126, and/or the substrate 160 (e.g., in an embodiment where the enclosure 170 is omitted). The gas sensor 182 may be configured to measure a concentration of the gas, oxygen, or a combination thereof.

The 3D printer 100 may also include a computing system 190. The computing system 190 may be configured to control the introduction of the printing material 120 into the ejector 110, the heating elements 130, the power source 132, the camera 140, the light source 150, the substrate control motor 164, the gas source 180, the gas sensor 182, or a combination thereof. For example, the computing system 190 may be configured to receive the images and/or video from the camera 140 and to characterize the behavior of the drops 124 that are ejected from the nozzle. The computing system 190 may also be configured to adjust one or more parameters of the 3D printer based at least partially upon the behavior of the drops. Additionally, the computing system 190 may be configured to interrupt a print job, alert an operator of unfavorable printing conditions, and or suggest corrective measures. The monitoring of the ejected drops may be part of a real-time closed loop control system provided by the computing system 190 an implemented by diagnostic software.

Figure 2:
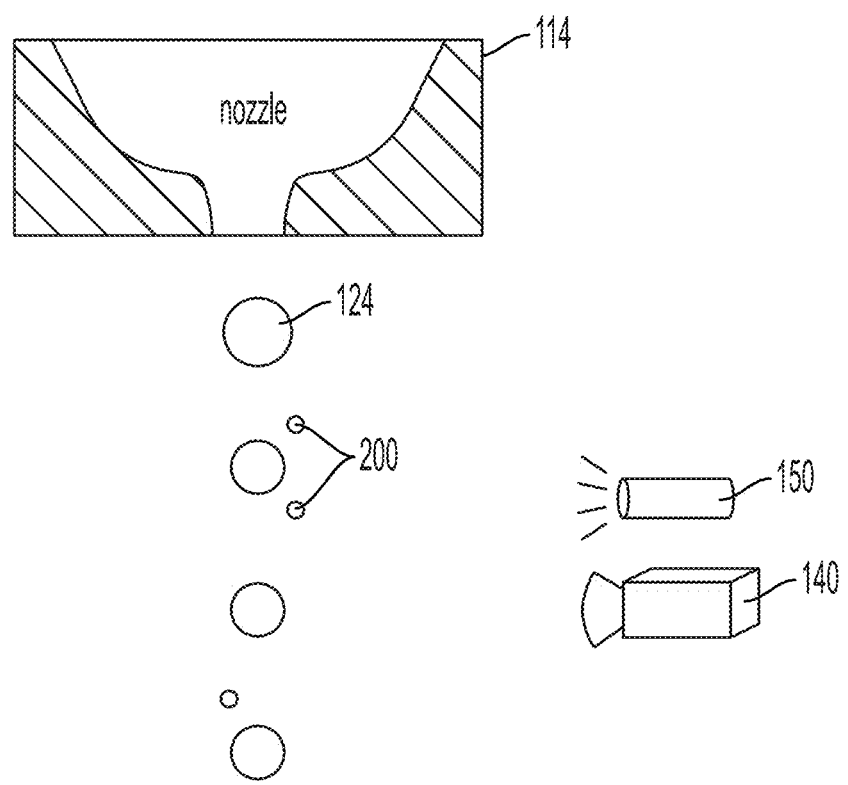
FIG. 2 depicts a side view of a portion of FIG. 1, in accordance with certain aspects of the present disclosure.

FIG. 2 depicts a side view of a portion of FIG. 1, in accordance with certain aspects of the present disclosure. More particularly, FIG. 2 depicts a side view of the nozzle 114, the camera 140, and the light source 150. The camera 140 and the light source 150 may be directed toward at least a portion of the stream of jetted material. In FIG. 2, four drops 124 of the liquid printing material 120 are shown. The drops 124 have been jetted from the nozzle 114 and are descending toward the substrate 160 (not shown in FIG. 2). In addition to the drops 124, there are additional fragments of the liquid printing material 120, referred to herein as satellites 200. The satellites 200 are smaller fragments of ejected material, which may be liquid or solid, and are undesirable because they tend to be deposited in an uncontrolled manner that negatively affects the shape and mechanical properties of the printed part. The drops, satellites, and other fragments of material may be referred to herein as elements of the jetted material.

In embodiments, the light source 150 is a strobe light that illuminates the drops at a strobe frequency intended to correspond with the frequency at which the droplets are ejected. At the same time, the camera 140 can be configured to exhibit an exposure time to covers several activations of the strobe. For example, the light may be configured to strobe at a frequency that is one sixth the frequency of the droplet ejection, such that the strobe will be activated once for every six drop ejections, resulting in an image of six drops at six different drop locations. The camera exposure time may be set to be a multiple of the strobe period, so that multiple strobes may be captured by the same exposure, resulting in over lapping images of several droplets. The degree of overlap between the drops in the captured images may serve as an indication of the quality and consistency of the printing system, as described further in relation to FIG. 3.

Figure 3:
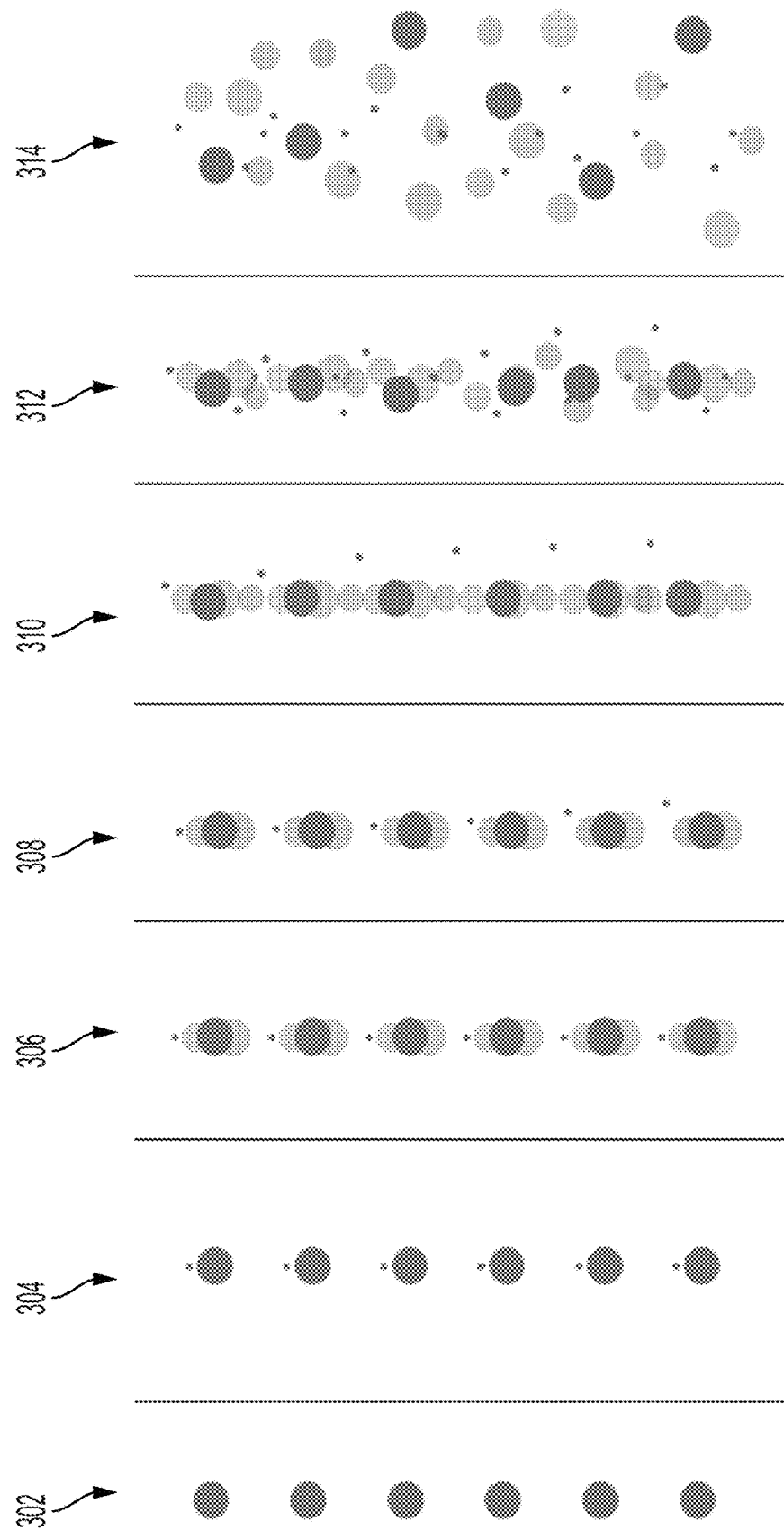
FIG. 3 illustrates various print quality conditions that may be encountered during use of the 3D printer shown in FIG. 1, in accordance with certain aspects of the present disclosure.

FIG. 3 illustrates various print quality conditions that may be encountered during use of the 3D printer shown in FIG. 1, in accordance with certain aspects of the present disclosure. In some embodiments, the diagnostic software may classify the print quality according to the various conditions described in relation to FIG. 3. For example, each time the diagnostic software determines the print quality, the diagnostic software may assign a ranking, referred to herein as a quality score, related to one of the illustrated conditions.

The quality score is a score that describes the level of jetting quality exhibited by the 3D printer at the time and under the conditions of printing a given job. The jetting quality refers to the degree to which the elements of jetted material conform with the ideal droplet characteristics and form droplets of a same size, shape, alignment, and jetting frequency. The quality score characterizes the degree of jetting quality and provides an estimate for how far the jetting quality is from the ideal at any given time during a particular print job. The computed quality score, or a corresponding image, may be displayed to the user (e.g., the operator of the 3D printer) to inform the user about the quality of the printing process.

The first illustration 302 represents a printing condition representative of an ideal jetting quality. In this illustration, there is only one drop visible per location, indicating that the drops are being ejected at the desired timing (i.e., frequency and speed). Each droplet also shows the same droplet volume and shape. Additionally, the drops are evenly spaced, with minimal change in the drop position (referred to herein as bounciness).

In the second illustration 304, there is one main drop visible per location, the drops are evenly spread, and there is minimal change in the drop position. However, there are small in-line satellites in line with the main jet, which may indicate a somewhat reduced quality.

In the third illustration 306, there are multiple drops visible at each location with small in-line satellites, and the positions of the drops are beginning to exhibit moderate bounciness. However, the drop waveforms are distinct and all of the drops are in-line. While not ideal, the level of quality shown in the third illustration may still be acceptable for printing.

In the fourth illustration 308, there are multiple drops visible at each location with small in-line satellites and moderate main drop bounciness. However, the drops waveforms are distinct and all of the main drops are in-line. However, while the satellites higher in the jet stream are in line, satellites lower in the jet stream are beginning to drift out-of-line.

In the fifth illustration 310, there are multiple drops visible at each location and the drop waveforms are starting to blend together (i.e., non-coherent). The drop bounciness is becoming more severe, and there is an out-of-line satellite stream. With this level of quality, the printed object can be expected to have defects, but the part will still be recognizable.

In the sixth illustration 312, the drop waveforms are blended together with no distinct positions and it is difficult or impossible to recognize individual drops. Additionally, there are multiple out-of-line satellites. However, the central jet line is still discernable. With this level of quality, jetting is most likely unrecoverable and may result in a failed 3D print.

In the seventh illustration 314, the drop waveforms are blended together with no distinct positions and it is difficult or impossible to recognize individual drops. There are multiple out-of-line satellites and main drops and the central jet line is completely lost. With this level of quality, jetting is almost certainly unrecoverable and the print job should be stopped.

The quality score value applied by the diagnostic software may correspond with one the conditions shown in one of the illustrations shown in FIG. 3. The specific score value applied may be determined by identifying the characteristics of individual drops and satellites, such as the positions of the drops, size or shape (e.g., circularity) of the drops, grouping of the drops, the number of satellites present and positions, among other factors. In addition to the quality score, the diagnostic software may also present individual droplet analytics to the user as well as processed or captured images of the jet stream.

Figure 4:
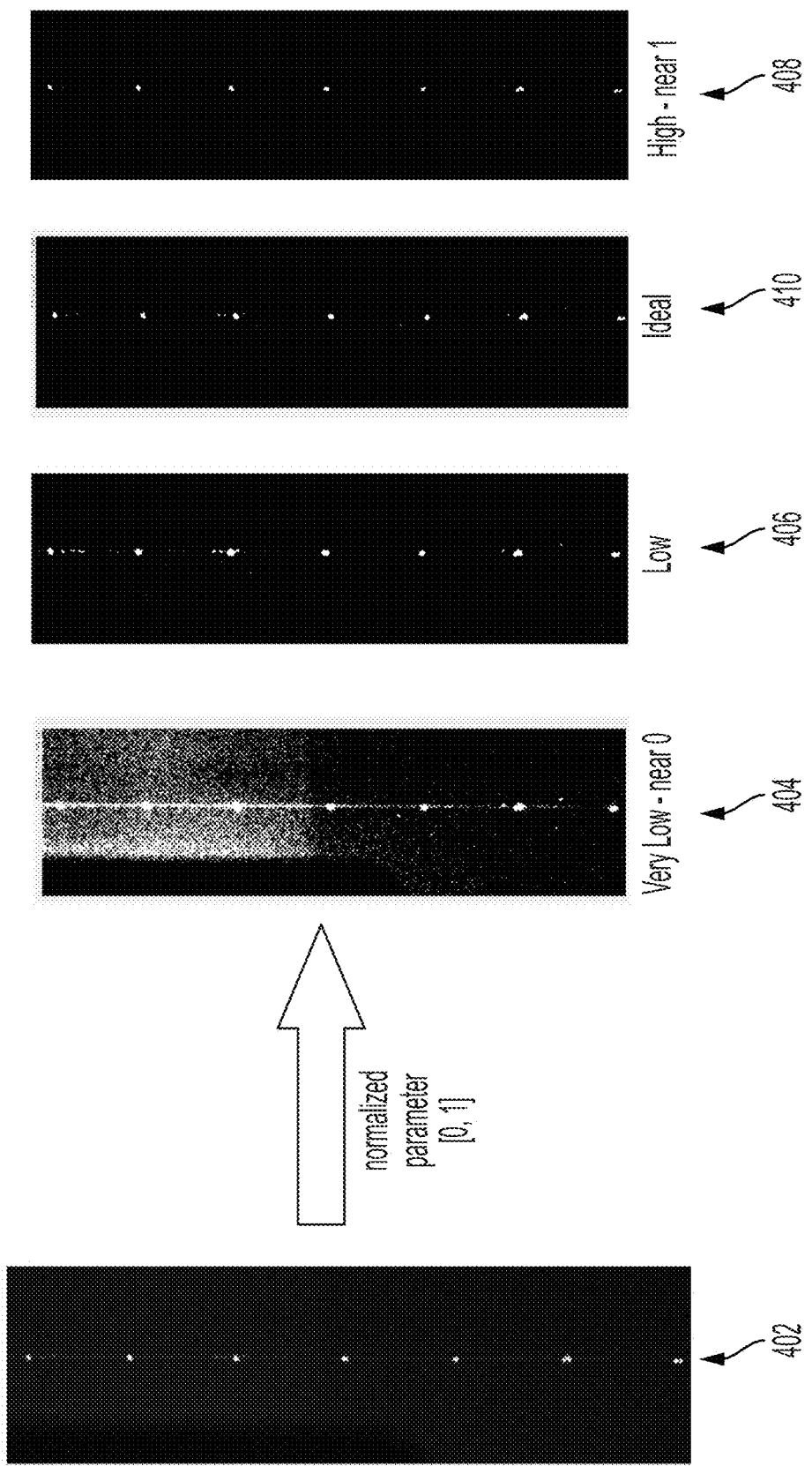
FIG. 4 illustrates various binarization results that can be obtained using different intensity thresholds in accordance with embodiments.

FIG. 4 illustrates various binarization results that can be obtained using different intensity thresholds in accordance with embodiments. Image 402 represent a raw image captured using a front-light configuration and exhibiting a dark background. The brightness of the background may be effected by a number of factors including the camera angle, light source intensity and angle, ambient light levels, etc. The image 402 includes a number of droplets and satellite droplets in the foreground of the image. The binarization method implemented should be able to extract every droplet and satellite element in every frame without adding or losing information.

Each pixel in the captured image exhibits a pixel intensity or brightness which can be normalized to vary between 0 and 1. To binarize the image using an intensity threshold, the intensity of each pixel is compared to a threshold intensity and converted to a zero if below the threshold or one if above the threshold. The selection of the threshold intensity value can determine the quality of the binarization. Binarized images 404, 406, 408, and 410 show some of the images that may be obtained using different threshold values.

Image 404 shows the type of image that could be obtained if the threshold is set very low, i.e., close to zero. As seen in image 404, there is a large amount of noise in the image due to pixels that are only slightly above the threshold. This level of noise can obscure the important information and make it nearly impossible to provide meaningful diagnostics.

Image 406 shows an image that could be obtained using a higher threshold which is nevertheless too low. In this image, the droplets are clearly identifiable. However, the droplet sizes are too large in appearance and there are a number of noise pixels present that may be wrongly identified as satellites.

Image 408 shows an image that could be obtained if the thresholding value is set to high, for example, near 1. In this example, the droplets are too small and all of the satellites have been removed.

Image 410 shows an improved binarized image that may be obtained using any of the techniques described herein. In this example, all of the droplets are presented with accurate sizes and shapes, and all of the actual satellites are present. Obtaining an accurate binarized image 410 depends at least in part on proper selection of the intensity threshold value. However, this value may vary from image to image and even from frame to frame due to variations in the lighting and the appearance of the background, for example. The proper threshold could be identified manually through visual inspection. However, such a process would be time a labor intensive and not suitable for real-time analytics. FIGS. 5-11 describe adaptive intensity-based thresholding techniques that are able to consistently extract features at multiple scales and across frames despite the possible variations in the background pattern and the intensity in the images. Additionally, the thresholding techniques described herein use much less processing resources compared to deep convolutional object detection methods such as YOLO (You Only Look Once), Faster R-CNN (Region-based Convolutional Neural Networks), or SSD (Single Shot Detector).

In some embodiments, additional processing of the binarized image can be performed in addition to the intensity thresholding techniques described herein. For example, an additional thresholding filter may be applied to mitigate potential interference not eliminated by the intensity threshold technique. The additional thresholding filter may apply a threshold object size. Such a filter may be able to eliminate noise artifacts that have a high intensity but occupy a small number of pixels or even a single pixel.

Figure 5:
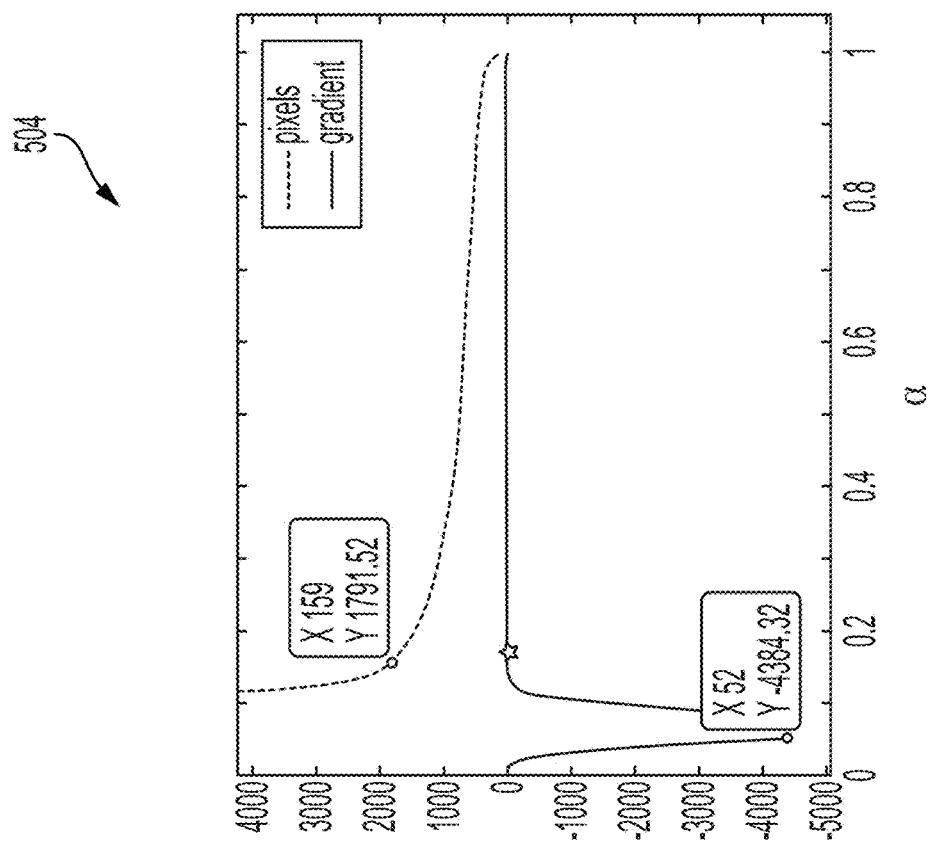
FIG. 5 illustrates an intensity thresholding technique in accordance with certain aspects of the present disclosure.
Figure 5:
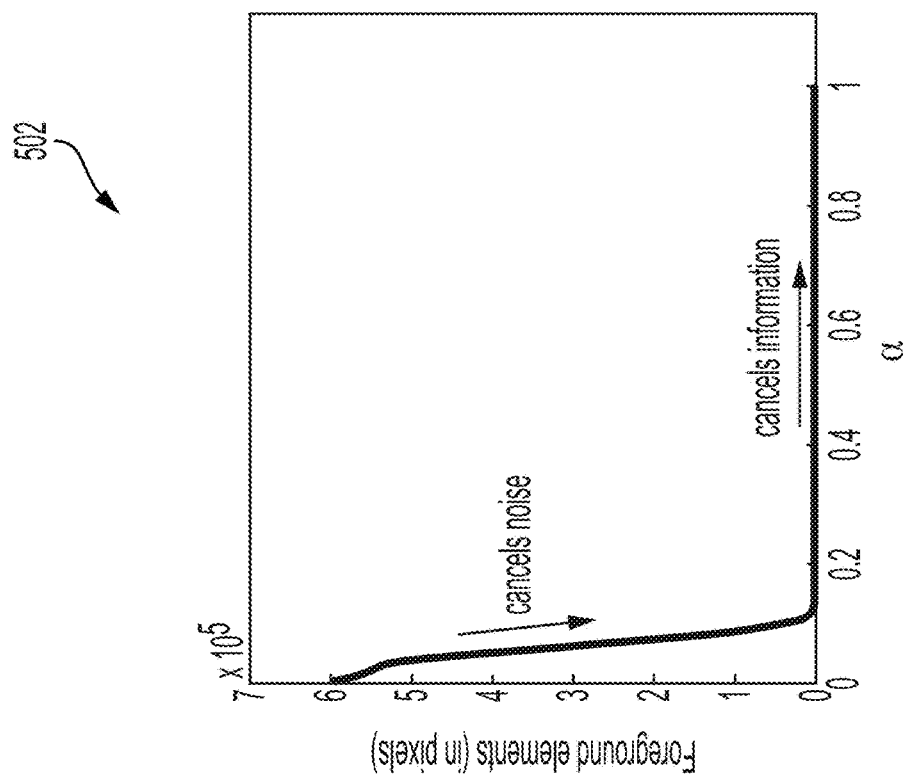

FIG. 5 illustrates an intensity thresholding technique in accordance with certain aspects of the present disclosure. In particular, the curve of graph 502 illustrates the number of foreground elements as function of the threshold value, a. The geometric characteristics of the droplet and satellites control the manner with which this function vanishes as cutoff approaches 1. Initially, there is a very steep reduction in foreground objects related to amorphous noise. For small values in this area, increasing the threshold a eliminates background noise. Next, there is a change in curvature and then a significantly smoother shrinking of foreground elements. This is the area where cutoff eliminates useful droplet and satellite information. The "noise cancellation" and "information cancellation" areas of the intensity curve are merged with an intermediate "gray area" domain where the transitioning occurs.

Graph 503 shows an expanded view of the gray area overlaid with a corresponding numerical gradient curve, which represents the slope of the foreground element number curve. The grey area domain is defined implicitly through the numerical gradient curve. Specifically, the gray area domain exists between the minimum of the gradient to the first time the gradient reaches a plateau. The onset of the gradient's plateau signifies the beginning of the information cancellation range of cutoff value, and is marked in graph 504 with the star. In the example shown in FIG. 5, the gradient achieves negative values fast towards a minimum at a=52 before starting to increase, and the onset of the gradient's plateau is identified at a=159, which signifies the end of the noise cancellation region. Accordingly, converting the raw image to the binarized image with a cutoff value a=159 (the star value) would be expected to yield a near ideal binarized image that captures both droplet and satellite features but eliminates noise as shown in image 410 (FIG. 4).

Figure 6:
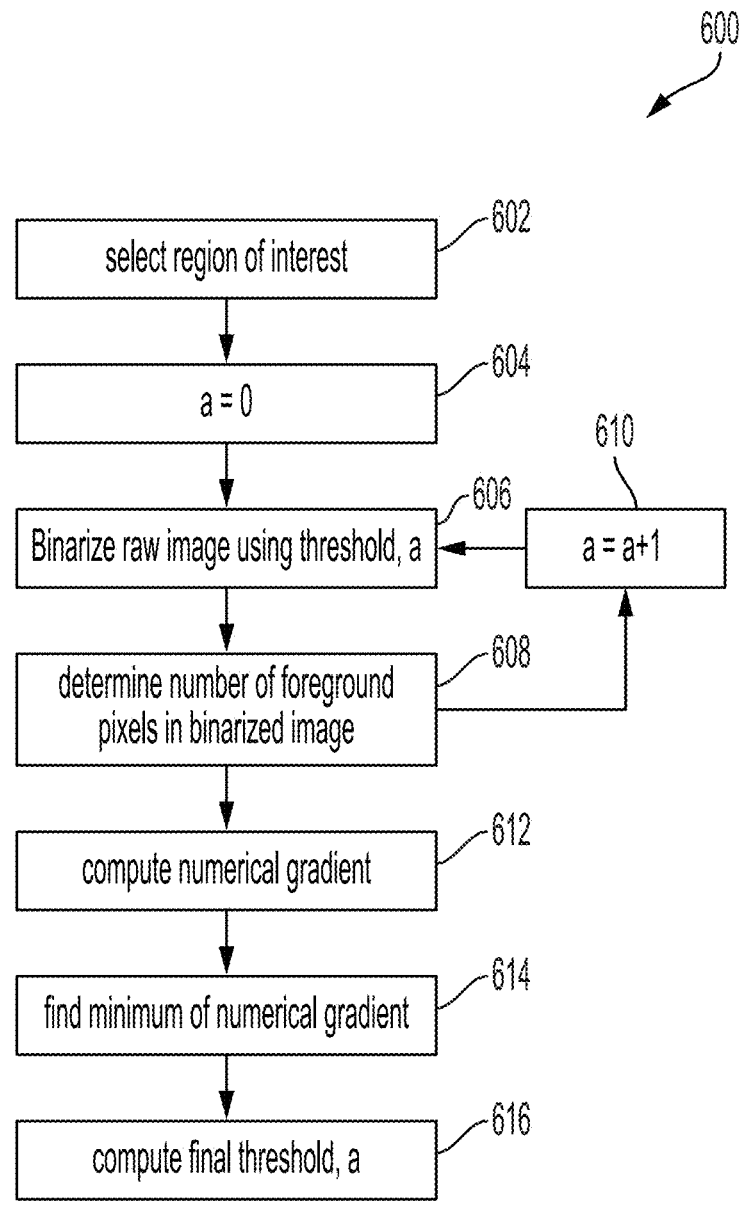
FIG. 6 is a process flow diagram of an example method of binarizing an image using the thresholding technique of FIG. 5.

FIG. 6 is a process flow diagram of an example method of binarizing an image using the thresholding technique of FIG. 5. The method may be performed by a computing device such as the computing device 190 shown in FIG. 1. The method may begin at block 602.

At block 602, the image is processed to identify a region of interest. Identifying the region of interest may be performed in accordance with the techniques described in relation to FIGS. 11 and 12.

At block 604, the threshold is set to an initial value of zero. At block 606, the raw image is binarized using the current threshold value. At block 608, the number of foreground pixels in the binarized image is determined. At block 610, the threshold value, a, is incremented and the process flow then returns to block 606. Blocks 608 and 610 may be repeated for each increment of the threshold value, a, and the resulting number of foreground pixels in the binarized image is stored to memory each time. The threshold value may be incremented by one for each iteration. However, in some embodiments, the threshold value may be incremented by a larger number (e.g., 2, 5, 10, etc.) to save on processing time while still yielding acceptable results.

Next at block 612, the numerical gradient is computed using the data determined at block 608. At block 614, the minimum value of the gradient is determined. At block 616, the final threshold, a, is computed based on the numerical gradient information. For example, the onset of the plateau in the numerical gradient can be determined by identifying the smallest value of a after the minimum gradient value for which the gradient is above some threshold gradient value. The identified value can be used to generate the final binarized image to be processed by the diagnostic software.

The techniques described in relation to FIGS. 5 and 6 may be used for any lighting and camera configuration that causes objects of interest to be monotonically higher or lower intensity than the rest of the region of interest. Accordingly, this method may also be used in cases in which the droplets are lit from behind (i.e., opposite side of the camera), in which case the droplets and satellites will appear as dark spots and the intensity threshold refers to a maximum intensity, below which pixels may be identified as foreground objects. Additionally, it will be appreciated that the thresholding techniques described herein is adaptive, meaning that is can be repeated to compute a new intensity threshold for each image frame.

Various operations are described as multiple discrete operations, in turn, in a manner that is most helpful in understanding the present disclosure, however, the order of description may not be construed to imply that these operations are necessarily order dependent. In particular, the operations shown in FIG. 6 need not be performed in the order of presentation.

Figure 7:
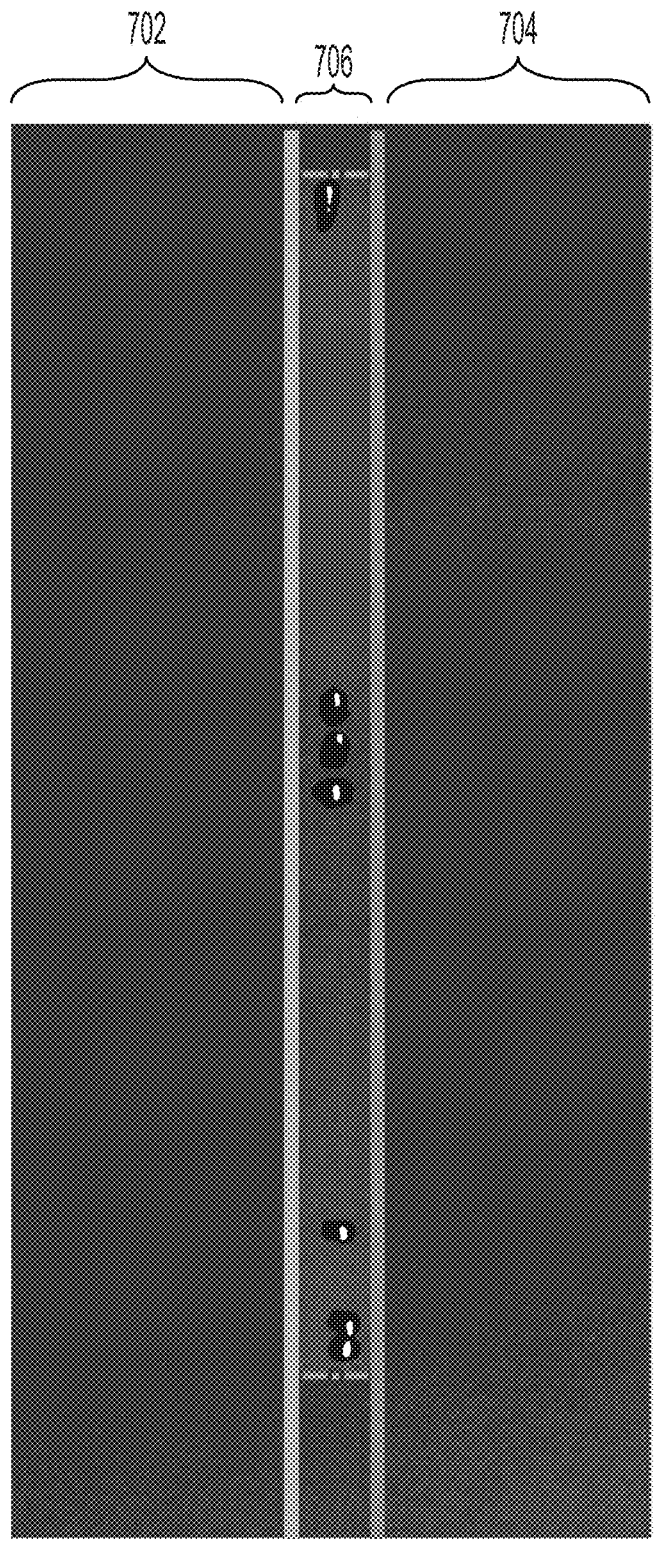
FIG. 7 illustrates another binarization technique, in accordance with certain aspects of the present disclosure.

FIG. 7 illustrates another binarization technique, in accordance with certain aspects of the present disclosure. In some cases, depending on the test setup, the background may appear relatively bright, in which case foreground objects of interest may present as non-monotonic. In other words, the droplet areas may have some pixels that are brighter than the background and some pixels that are darker than the background. Thus, simply applying an intensity threshold as described in relation to FIGS. 5 and 6 would result in a loss of information about the objects of interest. The technique shown in FIG. 7 can be used in situations where the raw image data contains non-monotonic data.

In this technique, the raw image can be subdivided into a jetting-free domain and its complementary domain, referred to herein as the jetting path domain. The jetting-free domain represents the area of the image where liquid material is not expected, and the jetting path domain represents an area of the image expected to host foreground objects. In the example shown in FIG. 7, the jetting-free domain includes the left domain 702 and the right domain 704, and the jetting path domain is the middle domain 706. The middle domain 706 is selected as the region of the image that is more likely to include foreground objects, while the left domain 702 and the right domain 704 are expected to include mostly background. The left and right domains can be processed to estimate statistical features about the background, such as the first moment (e.g., the mean intensity) and the second moment (e.g. the standard deviation). These statistical estimates about the background can then be applied to differentiate between background pixels and foreground pixels for the image, including in the middle domain 706.

In some embodiments, background statistics can be computed for the jetting free domain as the convex sum of the left domain 702 and the right domain 704. In other words, the mean pixel intensity of the jetting-free domain can be computed as the convex sum of the mean pixel intensity of the left domain and the mean pixel intensity of the right domain. Similarly, the standard deviation of jetting-free domain can be computed as the convex sum of the standard deviation of the left domain and the standard deviation of the right domain.

In some embodiments, a particular pixel is determined to be part of a background object if the intensity of the particular pixel falls within a prescribed confidence interval of intensity values defined from the statistical data of the jetting-free domain. The confidence interval applied to the jetting path domain is defined via functions of statistical data from the jetting-free domain. For example, the mean pixel intensity and standard deviation the jetting-free domain can be used to compute a z-score (also known as standard score) for each data point in the middle domain. The z-score for the data point describes the number of standard deviations by which the data point is above or below the mean value of what is being measured.

Additionally, a z-score threshold may be set that describes a specified distance from the mean value (above or below). For each pixel of the middle domain, if the pixel's z-score is within the z-score threshold, it is identified as a background pixel, and if the pixel's z-score is outside of the z-score threshold (too high or too low), it is identified as a foreground pixel.

In some cases, it can be expected that there will be linear correlation along the horizontal axis, meaning that the background image may be fairly uniform across each horizontal row of pixels, or at least more so than across vertical rows. Accordingly, the techniques described herein may be applied on a row-by-row basis, as shown in FIG. 8.

Figure 8:
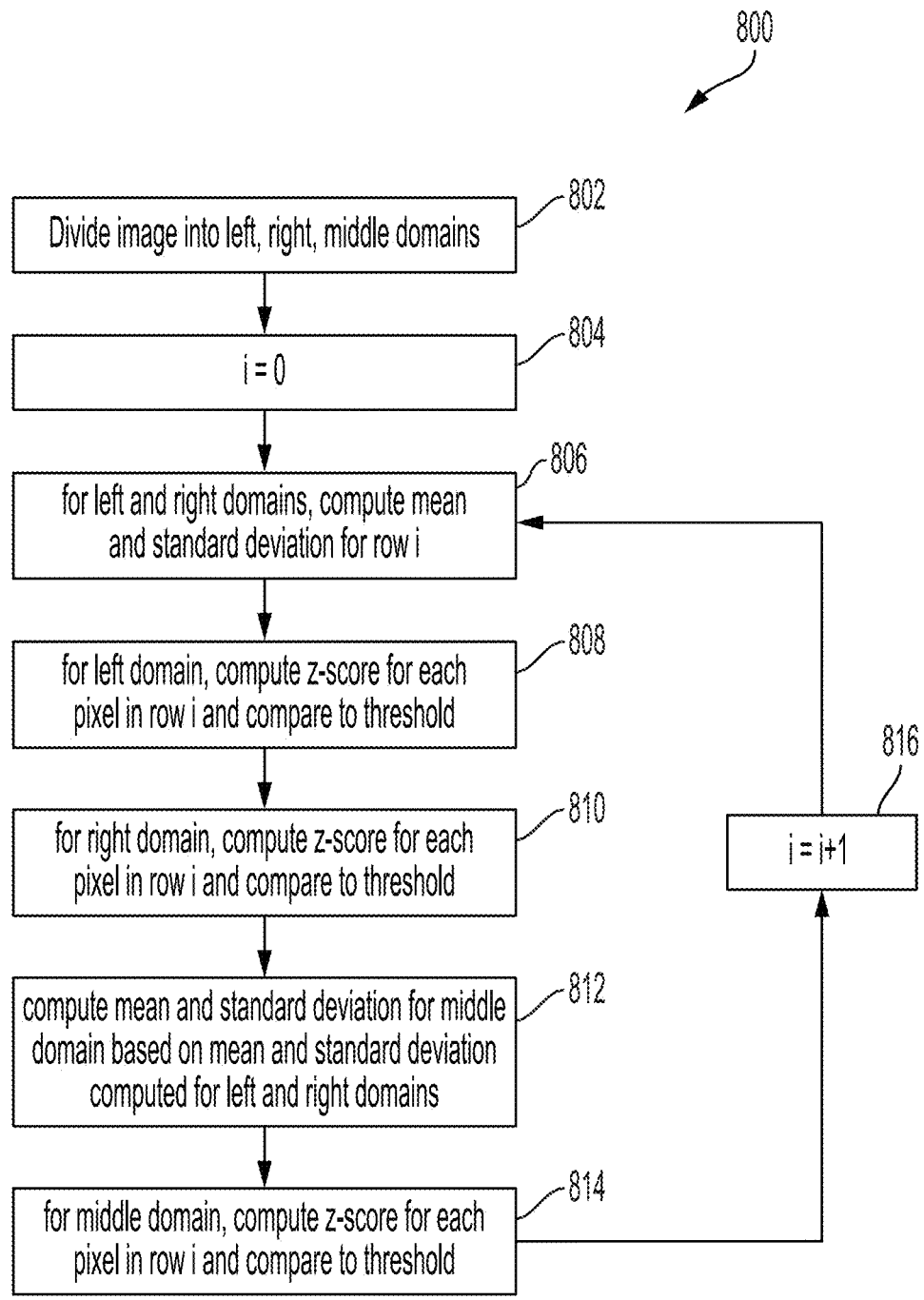
FIG. 8 is a process flow diagram of an example method of binarizing an image using the technique of FIG. 7.

FIG. 8 is a process flow diagram of an example method of binarizing an image using the technique of FIG. 7. The method may be performed by a computing device such as the computing device 190 shown in FIG. 1. The method may begin at block 802.

At block 802, the image is divided into a left domain, a right domain and a middle domain. The boundaries of these domains may be determined ahead of time based on an expectation of where the foreground particles more likely to occur. Additionally, the image may be converted from color to gray scale.

At block 804, the row indicator, i, is set to an initial value of zero. The processing described for the following blocks are performed on individual rows of pixels.

At block 806, the mean and standard deviation of the pixel intensity for the left domain is determined for row i, and the mean and standard deviation of the pixel intensity for the right domain is determined for row i.

At block 808, a z-score is computed for each left-domain pixel based on the corresponding mean and standard deviations computed for the left domain. Each pixel's z-score is compared to a threshold to determine whether it is to be identified as a background pixel or a foreground pixel. In particular, if the pixel's z-score is within the threshold, it is identified as a background pixel, and if the pixel's z-score is outside of the z-score threshold (too high or too low), it is identified as a foreground pixel.

At block 810, the same process performed at block 808 is performed for the right-domain. Specifically, a z-score is computed for each right-domain pixel based on the corresponding mean and standard deviations computed for the right domain, and each pixel's z-score is compared to the threshold to determine whether it is to be identified as a background pixel or a foreground pixel.

At block 812, a mean pixel intensity and standard deviation is computed for the middle domain based on the mean pixel intensity and standard deviation computed for the left and/or right domains at block 806. In some embodiments, the mean for the middle domain is computed as the convex sum of the mean of the left domain and the mean of the right domain, and the standard deviation of the middle domain can be computed as the convex sum of the standard deviation of the left domain and the standard deviation of the right domain.

At block 814, a z-score is computed for each middle-domain pixel based on the corresponding mean and standard deviations computed for the middle domain, and each pixel's z-score is compared to the threshold to determine whether it is to be identified as a background pixel or a foreground pixel.

At block 816, the row value is incremented by 1, and the process flow then returns back to block 806. The process repeats until each row of the image has been processed. At the end of the process, a binarized image has been generated, wherein each of the pixels has a binary value (e.g., zero or one) indicating whether it is part of the foreground or background.

The techniques described in relation to FIGS. 7 and 8 may be used for any lighting and camera configuration that causes objects of interest to be non-monotonic. However, these techniques can also be applied to any intensity pattern that is either monotonic or non-monotonic. Additionally, it will be appreciated that the thresholding techniques described herein is adaptive, meaning that is can be repeated to compute a new intensity threshold for each image frame.

Various operations are described as multiple discrete operations, in turn, in a manner that is most helpful in understanding the present disclosure, however, the order of description may not be construed to imply that these operations are necessarily order dependent. In particular, the operations shown in FIG. 8 need not be performed in the order of presentation.

Figure 9:
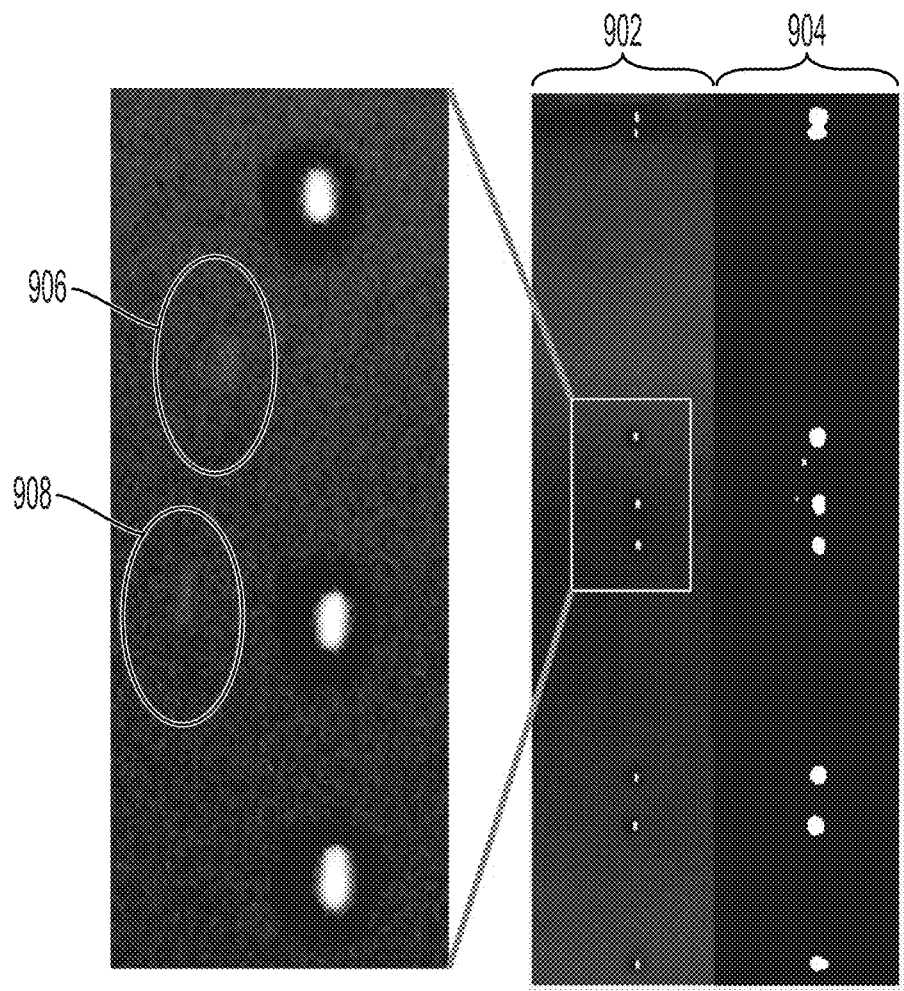
FIG. 9 illustrates example binarization results of the binarization technique of FIGS. 7 and 8.

FIG. 9 illustrates example binarization results of the binarization technique of FIGS. 7 and 8. The left image 902 represents a raw image captured for a stream of particles, and the right image 904 represents the corresponding binary version of the raw image. As seen in the magnified portion of the left image, there are two areas 906 and 908 in the left image that contain satellites that are faint and therefore hard to distinguish from the background. As shown in the binary image, the process described in FIGS. 7 and 8 are successful at distinguishing even these faint foreground objects.

Figure 10:
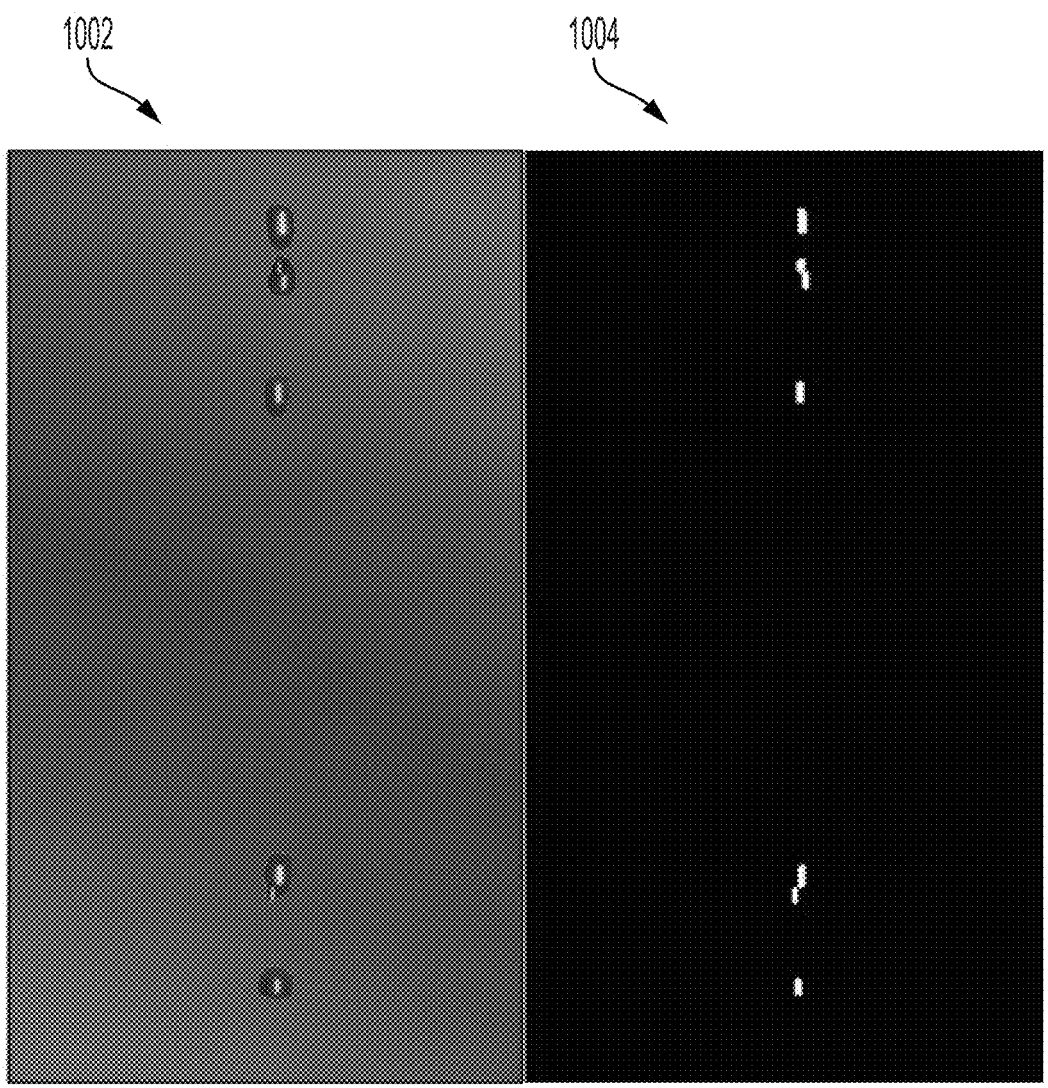
FIG. 10 illustrates another binarization technique, in accordance with certain aspects of the present disclosure.

FIG. 10 illustrates another binarization technique, in accordance with certain aspects of the present disclosure. In some embodiments, if the pixel intensity of the background varies in a monotonic manner, a plane fitting technique may be used to normalize the image to distinguish between foreground and background pixels. In such a technique, a plane function is fit to the pixel intensity data and then subtracted from the image data, thereby flattening the background. However, plane fitting only works well when the background varies monotonically.

In some cases, the background pixel intensity in images taken of the printer may vary non-monotonically from top to bottom and from side to side. This is illustrated in the left image 1002 of FIG. 10, wherein the upper right and lower left corners are relatively brighter that the center of the image. The pixel intensity gradually decreases from the upper right corner toward the center and then increases in intensity toward the lower left corner. Because the variation in the pixel intensity is not monotonic, fitting a plane does not model the pixel intensity well. In cases of non-monotonic variation, the background can be modeled using a polynomial function such a parabolic function. The polynomial function can be fit to the pixel intensity and then subtracted from the image to flatten the background. Because the features of interest are very small, they have little effect on fitting the parabola to the image data. The results of this process are shown in the right image 1004 of FIG. 10. The polynomial normalized image can then be used with the downstream techniques for analyzing the printing quality, such as segmenting, grouping and characterizing droplets and other features.

Figure 11:
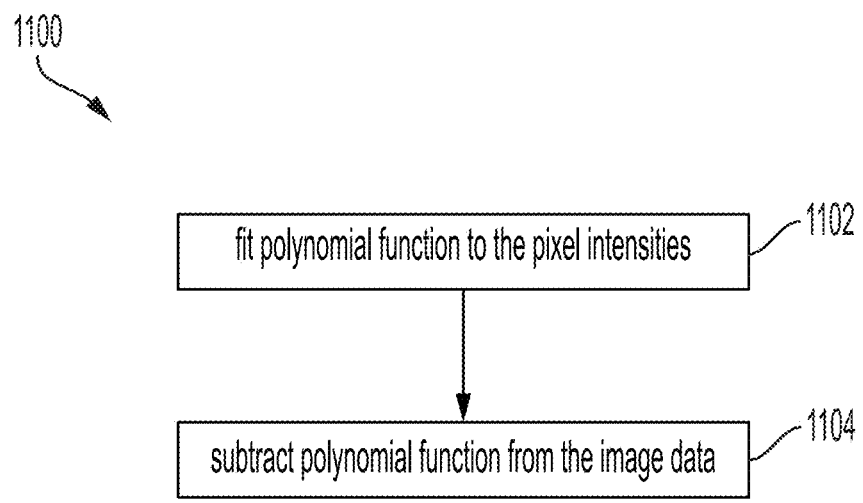
FIG. 11 is a process flow diagram of an example method of binarizing an image using the technique of FIG. 10.

FIG. 11 is a process flow diagram of an example method of binarizing an image using the technique of FIG. 10. The method may be performed by a computing device such as the computing device 190 shown in FIG. 1. The method may begin at block 1102.

At block 1102, a polynomial function is fit to the pixel intensities for the image. For example, if f(x,y) represents the intensity of a pixel located at position x, y within the image, then a parabolic function $z=b0+b1\,x+b2\,y+b3\,x'+b4\,y'$ can be fit to these intensities. The polynomial fitting can be performed using any suitable fitting algorithm.

At block 1104, the image background is flattened by subtracting the polynomial function from the image data. The background flattened image is then: $g(x, y)=f(x, y)-z(x, y)$. In some embodiments, the resulting image data, g(x, y), can be further normalized to scale the data to the appropriate color space. Assuming an 8-bit RGB color space, g(x, y) may be normalized as follows: $g(x, y)=\text{clip}(g(x, y)-\min(g(x, y)), 0, 255)$.

The techniques described in relation to FIGS. 10 and 11 may be used for any lighting and camera configuration that causes the background intensity to vary in non-monotonic manner. However, these techniques can also be applied to any intensity pattern that is either monotonic or non-monotonic. Additionally, it will be appreciated that the thresholding techniques described herein is adaptive, meaning that is can be repeated to compute a new intensity threshold for each image frame.

Various operations are described as multiple discrete operations, in turn, in a manner that is most helpful in understanding the present disclosure, however, the order of description may not be construed to imply that these operations are necessarily order dependent. In particular, the operations shown in FIG. 11 need not be performed in the order of presentation.

Figure 12:
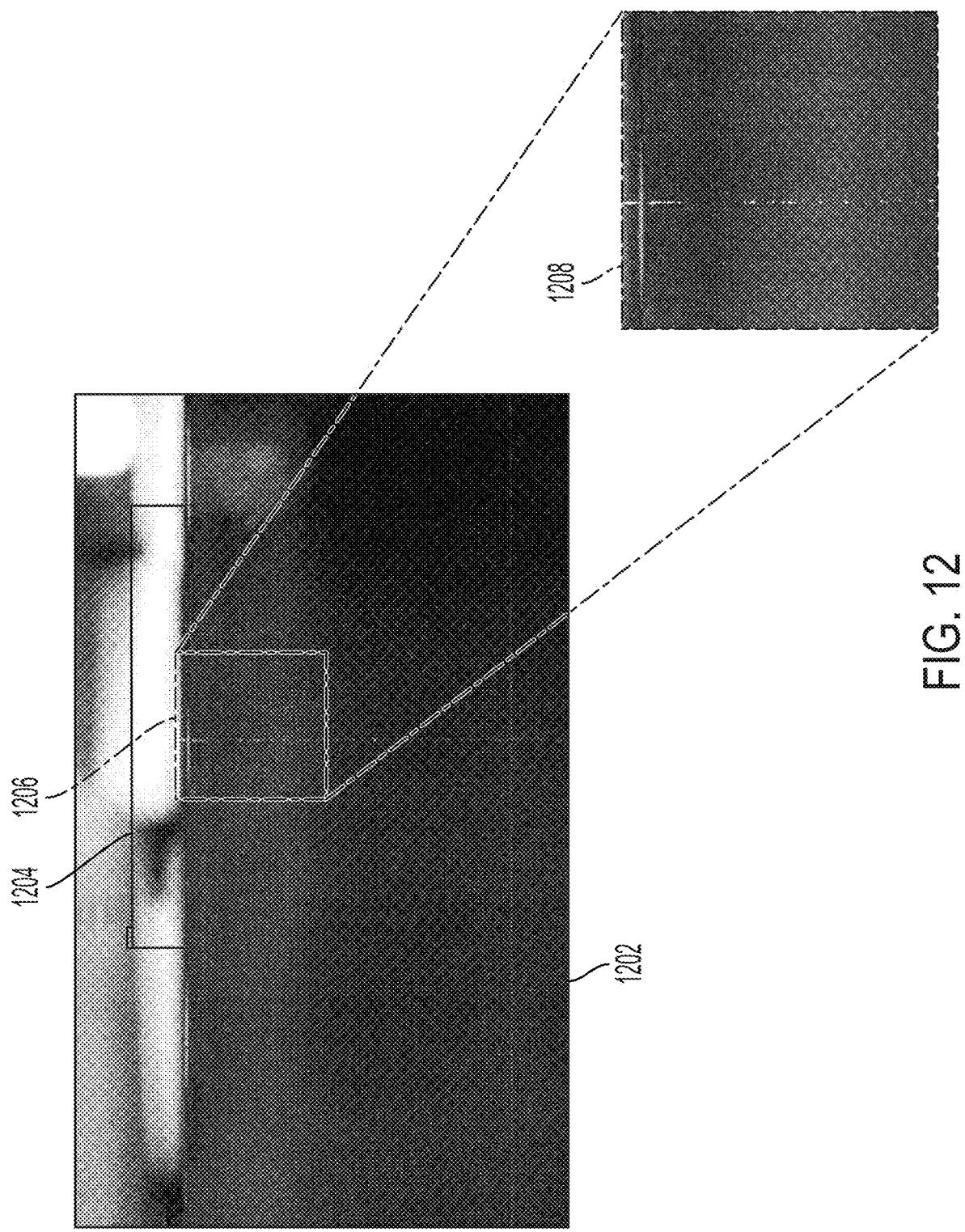
FIG. 12 illustrates a technique for determining a region of interest within a captured image, in accordance with certain aspects of the present disclosure.

FIG. 12 illustrates a technique for determining a region of interest within a captured image, in accordance with certain aspects of the present disclosure. In images taken with a free-standing camera, the precise location of the jetting region may not be well determined. To identify the region of interest (e.g., the jetting region) an image recognition algorithm may be used to identify a physical feature of the 3D printer. The region of interest can then be selected based, at least in part, on the location of the feature in the image and the known location of the feature relative to the jetting region. Additionally, the scale of the image can be determined based on the size of the feature in the image and the known size of the feature. The scale can also be used to effect the region of interest.

The image recognition algorithm may be any suitable machine learning algorithm, such as a deep convolutional neural-network trained on labeled images of the relevant 3D printer feature. The 3D printer feature may be a printhead or nozzle, for example. FIG. 12 shows the raw image 1202 captured by the camera. The box 1204 shows localization of the printer feature corresponding to nozzle which is returned by the image recognition algorithm. If the image recognition algorithm produces more than one bounding box, then the box with the highest confidence level that exceeds a minimum confidence threshold may be selected as the correct bounding box. The returned bounding box 1204 may be described by parameters that describe the left, top, right, and bottom boundary locations. The dimensions and position of the bounding box for the jetting region can be determined by specifying predetermined offsets that relate the printer feature box 1202 to the jetting region.

In the example shown in FIG. 12, the box's center ((left+right)/2), width (right−left), and height (bottom−top) are computed. The dimensions of the bounding box for the jetting region may be referred to herein as jet_left, jet_top, jet_right, and jet_bottom. Additionally, the size of the bounding box 1206 may be determined by setting a parameter jet_height equal to height/3 and jet_width to a value of 2 times jet_height. From this, the bounding box 1206 can be computed as follows:

$$
\text{Jet\_left} = \text{center} - \text{jet\_width}/2 \\
\text{Jet\_top} = \text{bottom} + \text{gap} \\
\text{Jet\_right} = \text{center} + \text{jet\_width}/2 \\
\text{Jet\_bottom} = \text{bottom} + \text{gap} + \text{jet\_height}
$$

In the above equations, the term Gap is a fixed parameter that leaves a small amount of space between the nozzle and the top of the jetting region.

Once the region of interest is determined, the raw image can be cropped according to the bounding box 1206, yielding image 1208. Image 1208 can then be returned for further processing by the diagnostic software.

Figure 13:
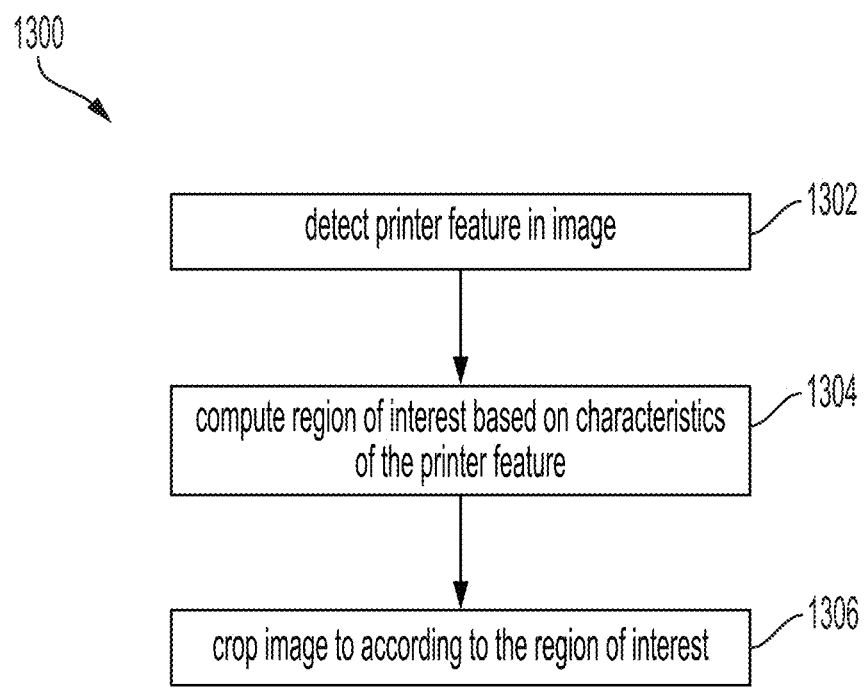
FIG. 13 is a process flow diagram of a method of identifying a jetting region in a captured image, in accordance with certain aspects of the present disclosure.

FIG. 13 is a process flow diagram of a method of identifying a jetting region in a captured image, in accordance with certain aspects of the present disclosure. The method may be performed by a computing device such as the computing device 190 shown in FIG. 1. The method may begin at block 1302.

At block 1302, an image recognition routine is used to identify a printer feature in the image. The result may be a bounding box that determines the size and position of the feature in the image.

At block 1304, the characteristics of the detected feature are used to determine the region of interest. For example, the values of a bounding box that describes the region of interest may be determined using predetermined formulas and offsets, which may vary depending on the printer feature and its size and location relative to the jetting area. One technique is described in relation to FIG. 12. However, other techniques are also possible.

At block 1306, the raw image is cropped according to the region of interest, e.g., the bounding box computed at block 1304. The resulting image may be stored and can be used for further processing by the diagnostic software.

The techniques described in relation to FIGS. 12 and 13 may be used for each captured image and may be particularly useful for cases wherein the camera angle may change such as when the camera is not permanently mounted to the 3D printer. Various operations are described as multiple discrete operations, in turn, in a manner that is most helpful in understanding the present disclosure, however, the order of description may not be construed to imply that these operations are necessarily order dependent. In particular, the operations shown in FIG. 13 need not be performed in the order of presentation.

Figure 14:
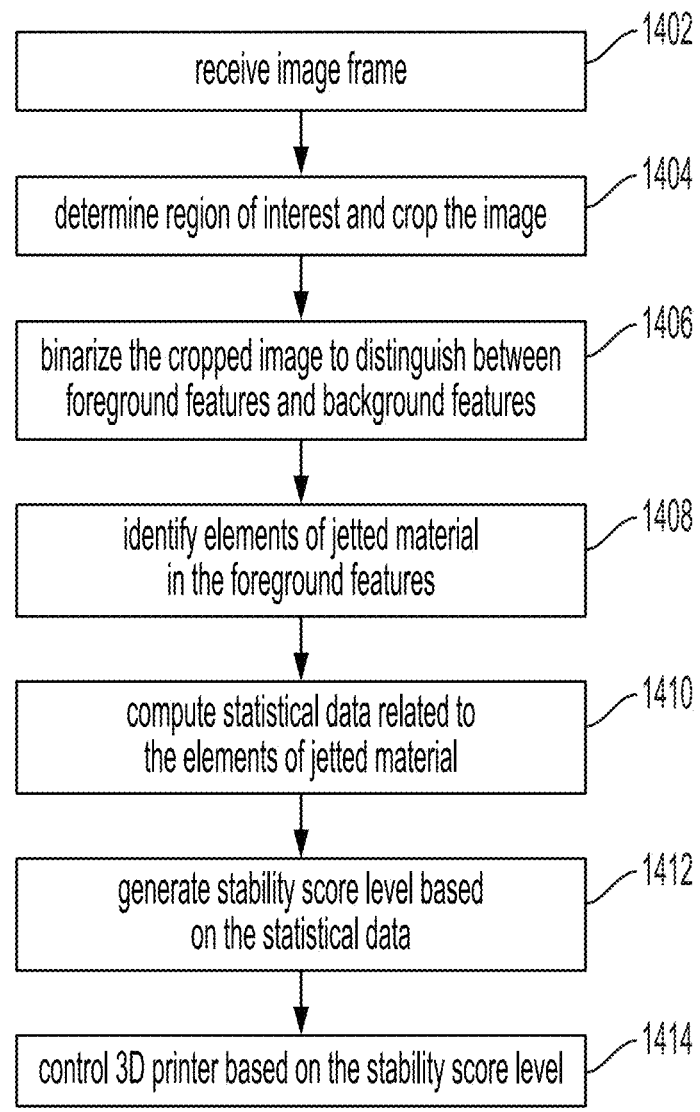
FIG. 14 is a process flow diagram summarizing a method of automatically assessing the jetting quality of a 3D printer, in accordance with certain aspects of the present disclosure.

FIG. 14 is a process flow diagram summarizing a method of automatically assessing the jetting quality of a 3D printer, in accordance with certain aspects of the present disclosure. The method may be performed by a computing device such as the computing device 190 shown in FIG. 1. The method may begin at block 1302.

At block 1402, an image frame is received. The image may be captured by the camera 140 (FIGS. 1 and 2) during the printing process or during a pre-printing test of the 3D printer.

At block 1404, an automatic localization routine is performed to determine a region of interest corresponding to the region in which jetting of material occurs. The received image can be cropped to the region of interest. An example of a localization routine is described in relation to FIGS. 12 and 13.

At block 1406, the cropped image is binarized to distinguish foreground features from background features. The image may be binarized using any suitable technique including the thresholding techniques described in relation to FIGS. 5-11.

At block 1408, elements of jetted material are identified in the foreground features. The elements of jetted material may be droplets and/or satellites.

At block 1410, statistical data related to the elements of jetted material are computed based on the images generated at block 1406. For example, the number, size, and positions of the droplets and satellites can be determined, among other information.

At block 1412, a quality score can be generated based on the statistical data, wherein the quality score indicates a degree to which the elements of jetted material conform with droplet characteristics associated with jetting coherency. In some embodiments, the quality score may be expressed as a ranking that corresponds with the printing quality categories shown in FIG. 3.

At block 1414, the 3D printer may be controlled based on the quality score. For example, if the 3D printer includes, or is otherwise in communication with, a display screen, controlling the 3D printer based on the quality score may include displaying data related to the quality score. For example, the quality score, the captured images, the computed statistical data, or some combination thereof may be displayed to an operator of the 3D printer. The various information may be displayed in a graphical user interface generated by the diagnostic software. In some embodiments, the quality score may automatically trigger certain actions of the 3D printer, such as adjusting a setting of the 3D printer or stopping the print job.

The techniques described in relation to FIG. 14 may be repeated iteratively for each captured image frame. Additionally, the quality score may be determined based on the statistical data generated for multiple frames. In other words, the quality score determined at any given time may be based on multiple frames rather than each single frame.

Various operations are described as multiple discrete operations, in turn, in a manner that is most helpful in understanding the present disclosure, however, the order of description may not be construed to imply that these operations are necessarily order dependent. In particular, the operations shown in FIG. 14 need not be performed in the order of presentation.

Figure 15:
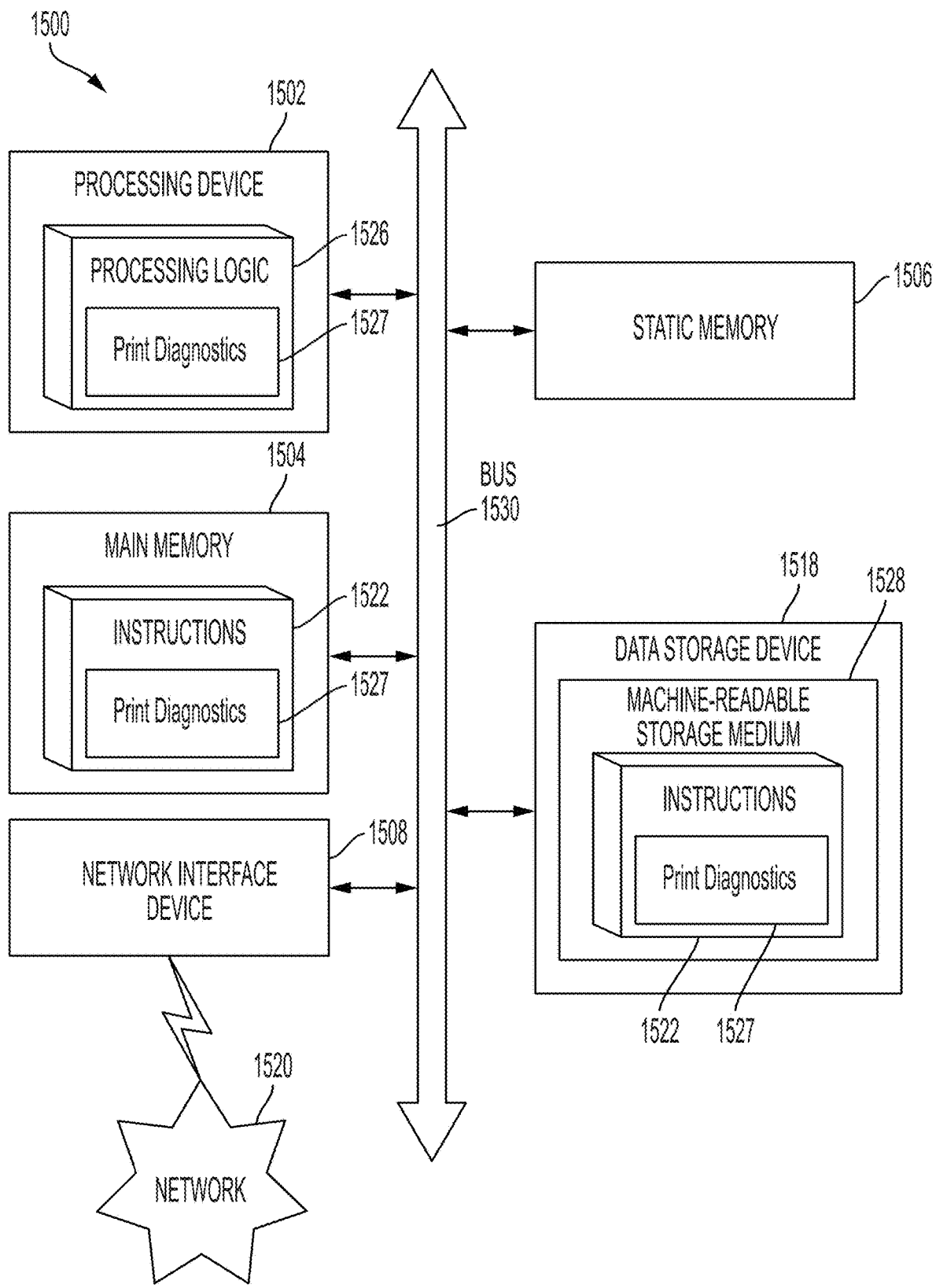
FIG. 15 illustrates an example computational system for performing operations of assessing jetting quality of a 3D printer, in accordance with certain aspects of the present disclosure.

FIG. 15 illustrates a diagrammatic representation of a machine in the example form of a computer system 1500 within which a set of instructions 1522, for causing the machine to perform any one or more of the methodologies discussed herein, may be executed. In various embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1500 includes a processing device 1502, a main memory 1504 (e.g., read-only memory (ROM), flash memory, dynamic random access memory (DRAM), a static memory 1506 (e.g., flash memory, static random access memory (SRAM), etc.), and a data storage device 1518, which communicate with each other via a bus 1530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 1502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1502 may also be one or more special-purpose processing devices such as an application specific integrated circuit (ASIC), a field programmable gate array (FPGA), a digital signal processor (DSP), network processor, or the like. The processing device 1502 may execute processing logic 1526 for performing the operations and steps discussed herein.

The data storage device 1518 may include a machine-readable storage medium 1528, on which is stored one or more set of instructions 1522 (e.g., software). The instructions may include a print diagnostics software 1527 embodying any one or more of the methodologies of functions described herein. The instructions 1522 may also reside, completely or at least partially, within the main memory 1504 or within the processing device 1502 during execution thereof by the computer system 1500; the main memory 1504 and the processing device 1502 also constituting machine-readable storage media. The instructions 1522 may further be transmitted or received over a network 1520 via the network interface device 1508.

The non-transitory machine-readable storage medium 1528 may also be used to store instructions to perform the methods and operations described herein. While the machine-readable storage medium 1528 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third,"

"fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method of determining print quality for a three-dimensional (3D) printer, comprising:
    obtaining an image of a stream of material jetted from a nozzle of the 3D printer;
    binarizing the image to distinguish background features from foreground features contained in the image;
    identifying elements of jetted material in the foreground features;
    computing statistical data characterizing the identified elements;
    generating, by a processing device, a quality score for a jetting quality based on the statistical data, wherein the quality score indicates a degree to which the elements of jetted material form droplets of a same size, shape, alignment, and jetting frequency; and
    controlling the 3D printer based on the quality score.

2. The method of claim 1, comprising:
    identifying a feature of the 3D printer using an image recognition algorithm; and
    identifying a region of interest in the image based, at least in part, on a location of the feature in the image and a known location of the feature relative to the stream of material.

3. The method of claim 1, wherein binarizing the image comprises:
    computing a gradient that describes a change in a number of background or foreground pixels in the image as a function of an intensity threshold value; and
    determining a final intensity threshold value based on the gradient; and
    binarizing the image using the final intensity threshold value.

4. The method of claim 1, wherein binarizing the image comprises:
    dividing the image into a jetting-free domain that is expected to not include foreground objects and a jetting path domain that is expected to include foreground objects;
    computing statistical data for the image on the jetting-free domain; and
    binarizing a complimentary domain into foreground and background objects using the statistical data of the jetting-free domain.

5. The method of claim 4, wherein the statistical data for the jetting-free domain comprises a mean pixel-level intensity and standard deviation pixel-level intensity for the jetting-free domain, and binarizing the image comprises determining that a particular pixel is part of the background objects if an intensity of the particular pixel falls within a confidence interval of intensity values defined from the statistical data of the jetting-free domain.

6. The method of claim 4, wherein the jetting-free domain comprises a left domain to the left of the jetting path domain and a right domain to the right of the jetting path domain.

7. The method of claim 4, wherein binarizing the image comprises generating a z-score for a pixel using the statistical data and comparing the z-score to a threshold to determine whether the pixel is a foreground pixel or a background pixel.

8. The method of claim 1, wherein binarizing the image comprises:
    generating a matrix of pixel intensities for the image; and
    fitting a polynomial function to the matrix of pixel intensities and subtracting the polynomial function from the image to generate a flattened image.

9. The method of claim 1, wherein controlling the 3D printer based on the quality score comprises displaying the quality score on a graphical user interface associated with the 3D printer.

10. The method of claim 1, wherein controlling the 3D printer based on the quality score comprises discontinuing a print job if the quality score exceeds a threshold indicating poor print quality.

11. An apparatus for determining print quality of a three-dimensional (3D) printer, the apparatus comprising:
    a memory to store an image of a stream of material jetted from a nozzle of the 3D printer; and
    a processing device operatively coupled to the memory, wherein the processing device is to:
        binarize the image to distinguish background features from foreground features contained in the image;
        identify elements of jetted material in the foreground features;
        compute statistical data characterizing the identified elements;
        generate a quality score of jetting quality based on the statistical data, wherein the quality score indicates a degree to which the elements of jetted material conform with droplet characteristics associated with jetting coherency; and
        control the 3D printer based on the quality score.

12. The apparatus of claim 11, wherein the processing device is further to:
    identify a feature of the 3D printer using an image recognition algorithm; and
    identify a region of interest in the image based, at least in part, on a location of the feature in the image and a known location of the feature relative to the stream of material.

13. The apparatus of claim 11, wherein to binarize the image the processing device is to:
    compute a gradient that describes a change in a number of background or foreground pixels in the image as a function of an intensity threshold value; and
    determine a final intensity threshold value based on the gradient; and
    binarize the image using the final intensity threshold value.

14. The apparatus of claim 11, wherein to binarize the image the processing device is to:
    divide the image into a jetting-free domain that is expected to not include foreground objects and a jetting path domain that is expected to include foreground objects;
    compute statistical data for the image on the jetting-free domain; and binarize a complimentary domain into foreground and background objects using the statistical data of the jetting-free domain.

15. The apparatus of claim 14, wherein the statistical data for the jetting-free domain comprises a mean pixel-level intensity and standard deviation pixel-level intensity for the jetting-free domain, and to binarize the image the processing device is to determine that a particular pixel is part of the background objects if an intensity of the particular pixel falls within a confidence interval of intensity values defined from the statistical data of the jetting-free domain.

16. The apparatus of claim 14, wherein the jetting-free domain comprises a left domain to the left of the jetting path domain and a right domain to the right of the jetting path domain.

17. The apparatus of claim 14, wherein to binarize the image the processing device is further to:

generate a z-score for a pixel using the statistical data and comparing the z-score to a threshold to determine whether the pixel is a foreground pixel or a background pixel.

18. The apparatus of claim 11, wherein to binarize the image the processing device is to:

generating a matrix of pixel intensities for the image; and fitting a polynomial function to the matrix of pixel intensities and subtracting the polynomial function from the image to generate a flattened image.

19. The apparatus of claim 11, comprising:

a camera mounted to the 3D printer for capturing the image; and a strobe light mounted to the 3D printer to illuminate the material at a strobe frequency corresponding to a frequency at which the elements of jetted material are to be ejected from the nozzle.

20. The apparatus of claim 11, comprising a display screen to display the quality score.

* * * * *